United States Patent
Dong et al.

(10) Patent No.: US 9,186,636 B2
(45) Date of Patent: Nov. 17, 2015

(54) FROSTY SWIRL MACHINE

(76) Inventors: Lingyu Dong, Temple City, CA (US); Chundong Dong, Temple City, CA (US)

( * ) Notice: Subject to any disclaimer, the term of this patent is extended or adjusted under 35 U.S.C. 154(b) by 804 days.

(21) Appl. No.: 13/506,467

(22) Filed: Apr. 19, 2012

(65) Prior Publication Data

US 2013/0279288 A1   Oct. 24, 2013

(51) Int. Cl.
- *B01F 7/24* (2006.01)
- *B01F 15/00* (2006.01)
- *A23G 9/30* (2006.01)
- *B01F 7/16* (2006.01)
- *A23G 9/32* (2006.01)
- *B01F 15/02* (2006.01)
- *A23G 9/44* (2006.01)

(52) U.S. Cl.
CPC ............ *B01F 7/1605* (2013.01); *A23G 9/32* (2013.01); *A23G 9/44* (2013.01); *B01F 7/245* (2013.01); *B01F 15/026* (2013.01); *B01F 2215/0021* (2013.01)

(58) Field of Classification Search
CPC .... A23G 9/44; A23G 9/32; B01F 2215/0021; B01F 15/026; B01F 7/1605; B01F 7/245
See application file for complete search history.

(56) References Cited

U.S. PATENT DOCUMENTS

| | | | | |
|---|---|---|---|---|
| 2,094,354 A * | 9/1937 | Genova | ................. | 62/71 |
| 2,282,862 A * | 5/1942 | Genova | ................. | 62/188 |
| 2,415,585 A * | 2/1947 | Genova | ................. | 62/311 |
| 3,323,320 A * | 6/1967 | Conz | ................. | 62/303 |
| 3,505,075 A * | 4/1970 | Black | ................. | 426/318 |
| 4,506,988 A * | 3/1985 | Reed | ................. | 366/203 |
| 4,548,054 A * | 10/1985 | Levine | ................. | 62/342 |
| 4,548,508 A * | 10/1985 | Verkler | ................. | 366/195 |
| 4,637,221 A * | 1/1987 | Levine | ................. | 62/342 |
| 4,647,214 A * | 3/1987 | Kibby | ................. | 366/212 |
| 4,693,611 A * | 9/1987 | Verkler | ................. | 366/195 |
| 4,702,608 A * | 10/1987 | Garbar et al. | ................. | 366/146 |
| 4,708,489 A * | 11/1987 | Carlson | ................. | 366/149 |
| 4,740,088 A * | 4/1988 | Kelly, Jr. | ................. | 366/138 |
| 4,755,060 A * | 7/1988 | Pedersen | ................. | 366/286 |
| 4,828,398 A * | 5/1989 | Verkler | ................. | 366/279 |
| 6,318,889 B1 * | 11/2001 | Hansen, Sr. | ................. | 366/286 |
| 6,341,887 B1 * | 1/2002 | Hansen, Sr. | ................. | 366/138 |
| 2005/0249032 A1 * | 11/2005 | Heinhold et al. | ................. | 366/289 |
| 2013/0058184 A1 * | 3/2013 | Hansen | ................. | 366/138 |
| 2013/0265847 A1 * | 10/2013 | Little et al. | ................. | 366/286 |
| 2013/0279288 A1 * | 10/2013 | Dong et al. | ................. | 366/138 |

* cited by examiner

*Primary Examiner* — Tony G Soohoo
(74) *Attorney, Agent, or Firm* — Raymond Y. Chan; David and Raymond Patent Firm

(57) ABSTRACT

A frosty swirl machine includes a housing, a funnel, an auger for swirling ice-cream with other additives to become a mixture, a driving unit, and a protective cap. The protective cap has a passage opening movably mounted at a mixture outlet of the funnel, in such a manner that the protective cap is capable of moving between a opened position and a closed position, wherein in the opened position, the protective cap is moved to align the passage opening with the mixture outlet of the funnel so as to allow the mixture to pour out of the funnel through the mixture outlet and the passage opening, wherein in the closed position, the protective cap is moved to block the mixture outlet so as to prevent the mixture from being poured out of the funnel.

9 Claims, 4 Drawing Sheets

FROSTY SWIRL MACHINE

BACKGROUND OF THE PRESENT INVENTION

1. Field of Invention

The present invention relates to a swirl machine, and more particularly to a frosty swirl machine comprising a protective cap, a rinsing mechanism and a shielding arrangement for enhancing a swirling performance of the frosty swirl machine.

2. Description of Related Arts

A conventional swirl machine, such as an ice-cream making apparatus, usually comprises a housing, an auger with helical thread supported in the housing, a funnel or container also supported in the housing for holding the a predetermined amount of ice cream and any desirable additives. Either the auger or the funnel are rotatable with respect to the other, and after some rotations of either the auger or the funnel, the ice cream and additives have obtained a semi-liquid condition which is to be discharged out of the funnel for consumption.

There are several disadvantages related to this type of conventional swirl machine. First, the funnel and the auger are difficult to detach from the housing, yet they require frequent cleaning because ice-cream and the additives are mediums in which bacteria growth is prevalent. Thus, users of this type of conventional swirl machine must make extensive efforts in cleaning the funnel and the auger every time the machine is used for making ice-cream.

Second, when the machine has been used to mix ice cream and additives, the mixture contained in the funnel must be completely discharged or ice-cream residue will undesirably come out from a bottom discharge opening of the funnel. This presents serious hygiene and cleaning problem.

Third, when the auger is rotating to swirl the ice cream, a large amount of residue will go out of the funnel and splash all around the machine. This makes the surrounding areas of the swirl machine very dirty. For safety reasons, the conventional swirl machine may include a safety shield mounted in the vicinity of the auger so as to prevent people from touching the auger while it is rotating. However, while the safety shield may reduce the amount of residues from coming out of the funnel and reaching the surrounding area of the machine, the residues actually splash on the shield itself, making it very dirty after the machine is used. Thus, when the conventional swirl machine is used for mixing ice cream with additives, the relevant operators must detach many components (such as the funnel, the auger and the safety shield) from the housing and clean them one by one. After cleaning, the operators must reassemble those components back to the housing of the machine so that it can be used for next cycle of mixing. These procedures are very time-consuming and cumbersome.

SUMMARY OF THE PRESENT INVENTION

The invention is advantageous in that it provides frosty swirl machine comprising a protective cap, a rinsing mechanism and a shielding arrangement for enhancing a swirling performance of the frosty swirl machine while keeping the machine clean, efficient and convenient to use.

Another advantage of the invention is to provide a frosty swirl machine comprising a protective cap, which is capable of slidably moving between a closed position and an opened position for selectively controlling a discharge of the ice-cream mixture in a funnel.

Another advantage of the invention is to provide a frosty swirl machine comprising a rinsing mechanism, which is capable of conveniently and effectively cleaning an auger and the funnel of the frosty swirl machine. Note that an operation switch of the rinsing mechanism is provided on a housing at a position which can be easily accessed and controlled by a user of the present invention.

Another advantage of the invention is to provide a frosty swirl machine comprising a shielding arrangement, which is capable of preventing spill of mixture residue from the funnel while the frosty swirl machine is operating.

Another advantage of the invention is to provide a frosty swirl machine which to does not involve complicated mechanical and electrical components. Moreover, the operation mechanism of the present invention is made easy for the majority users.

Additional advantages and features of the invention will become apparent from the description which follows, and may be realized by means of the instrumentalities and combinations particular point out in the appended claims.

According to the present invention, the foregoing and other objects and advantages are attained by providing a frosty swirl machine, comprising:

a housing which has a receiving cavity formed therein, an defines a swirling platform;

a funnel having a storing cavity movably supported in the swirling platform, and is arranged to contain a mixture of ice-cream and additives, wherein the funnel further has a mixture outlet communicated with the storing cavity;

an auger rotatably supported in the housing, in such a manner that the auger is arranged to selectively receive in the storing cavity for swirling the ice-cream and the additives;

a driving unit received in the housing and is arranged to selectively drive the auger to rotate in the storing cavity for swirling the ice-cream and the additives; and a protective cap having a passage opening movably mounted at the mixture outlet of the funnel, in such a manner that the protective cap is capable of moving between a opened position and a closed position, wherein in the opened position, the protective cap is moved to align the passage opening with the mixture outlet of the funnel so as to allow the mixture to pour out of the funnel through the mixture outlet and the passage opening, wherein in the closed position, the protective cap is moved to block the mixture outlet so as to prevent the mixture from being poured out of the funnel Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
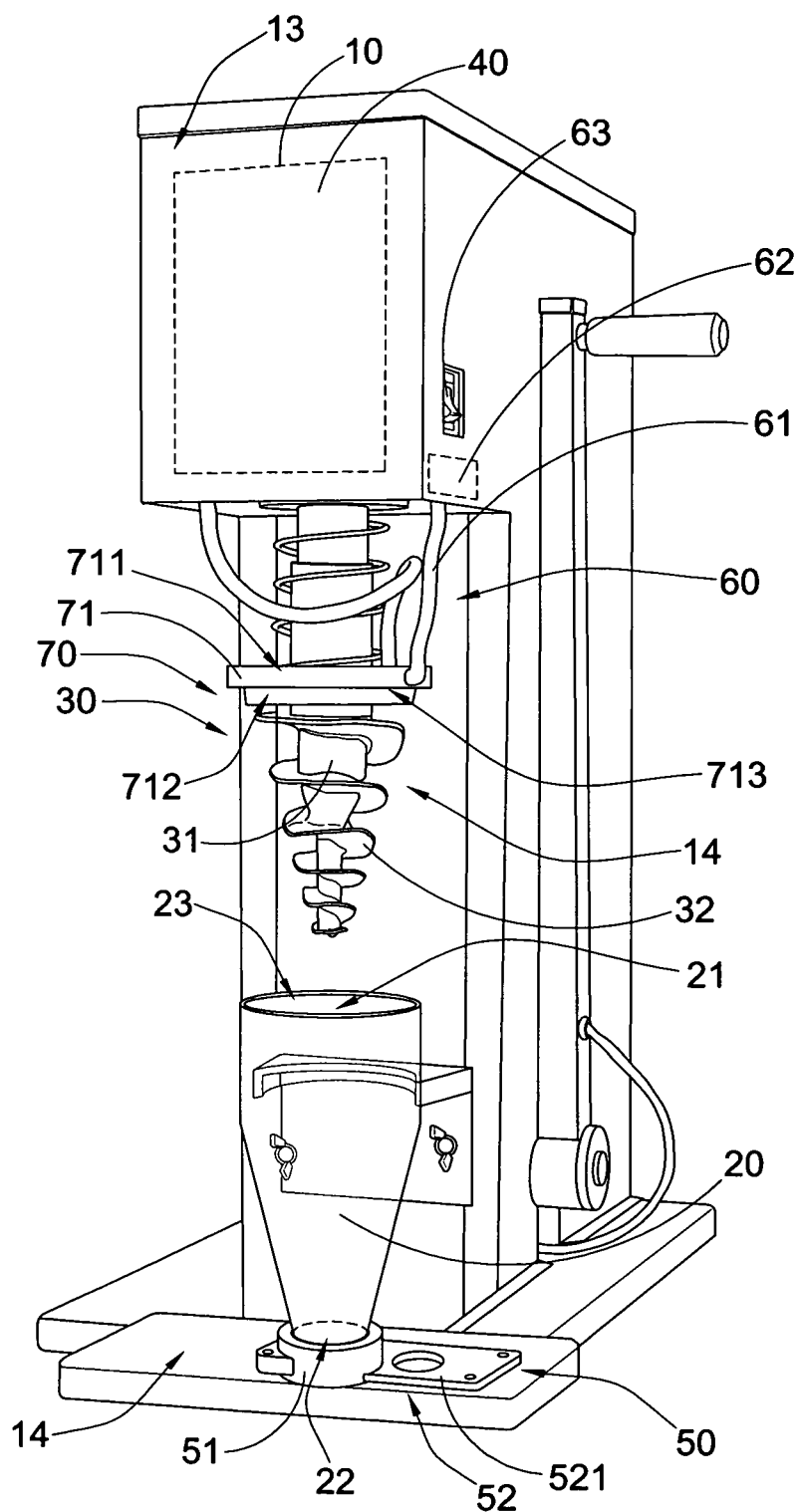
FIG. 1 is a perspective view of a frost swirl machine according to a preferred embodiment of the present invention.
Figure 2:
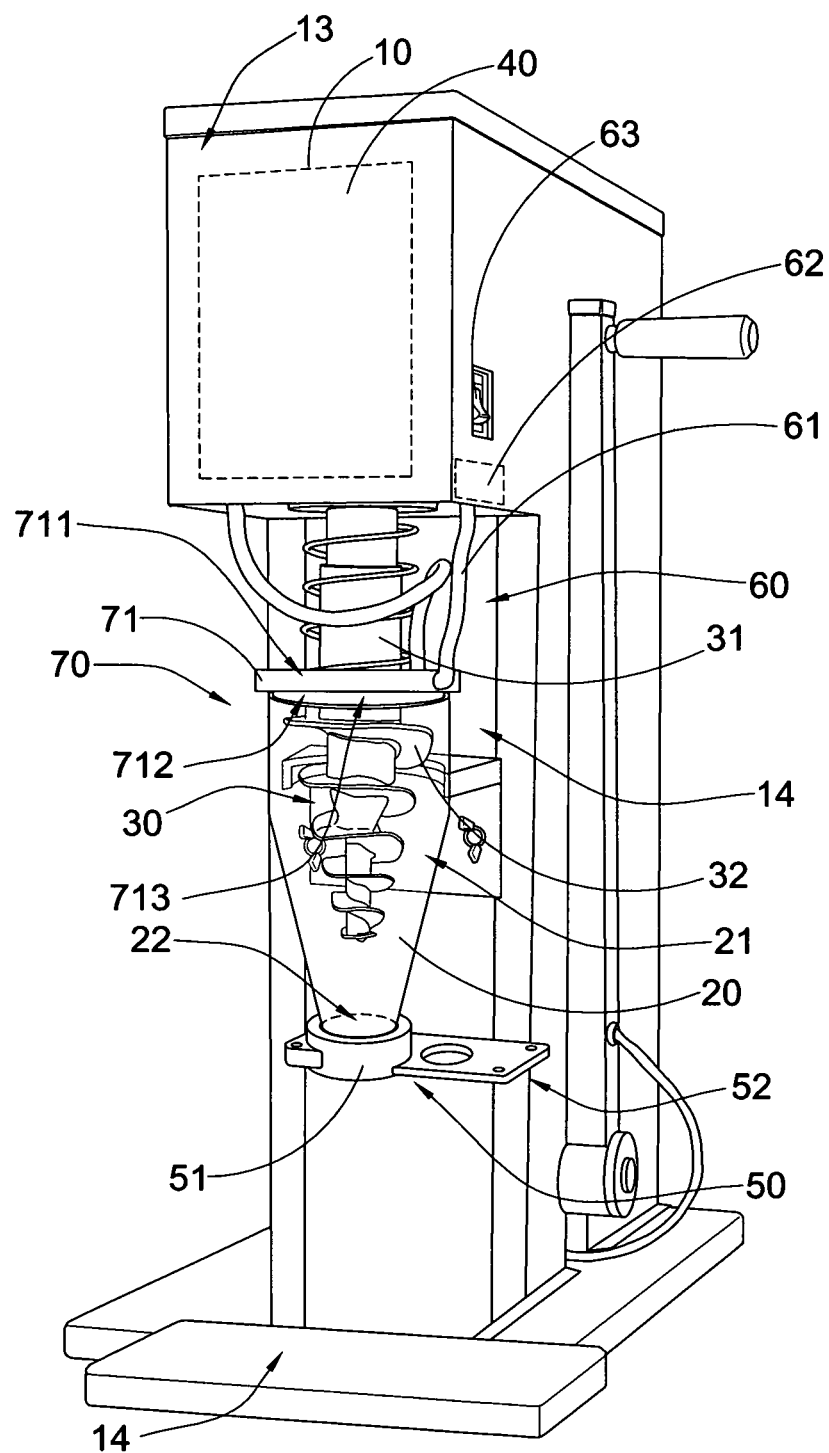
FIG. 2 is a schematic diagram of the frost swirl machine according to the above preferred embodiment of the present invention.
Figure 3:
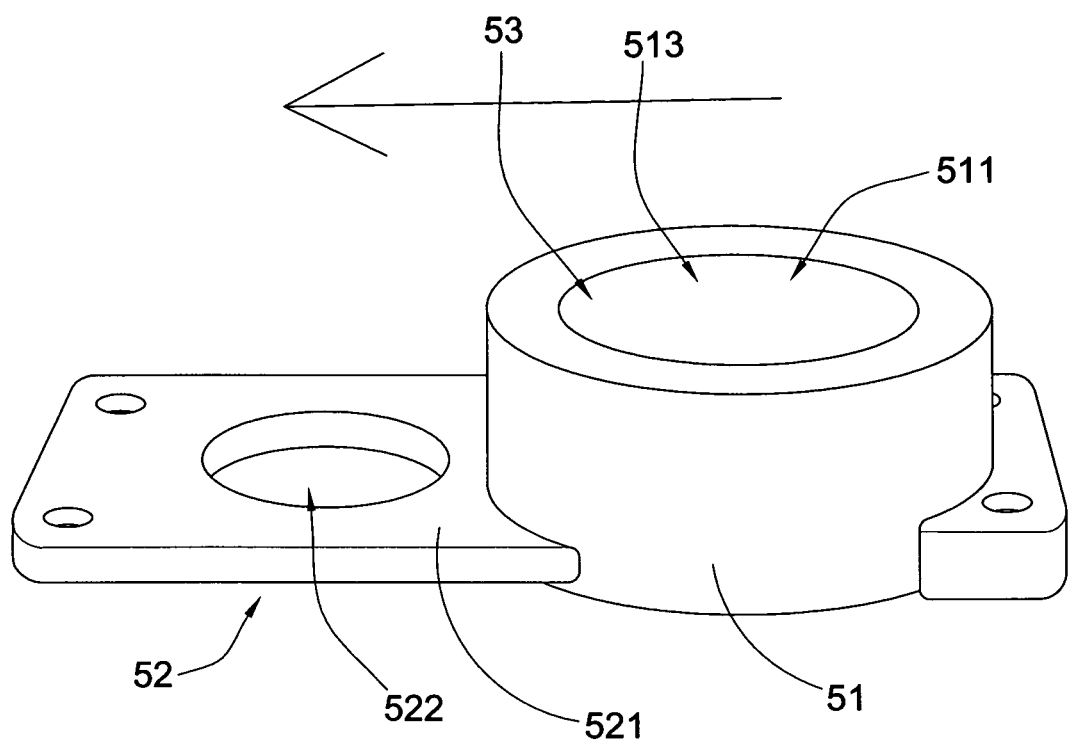
FIG. 3 is a perspective view of the protective cap of the frost swirl machine according to the above preferred embodiment of the present invention.
Figure 4:
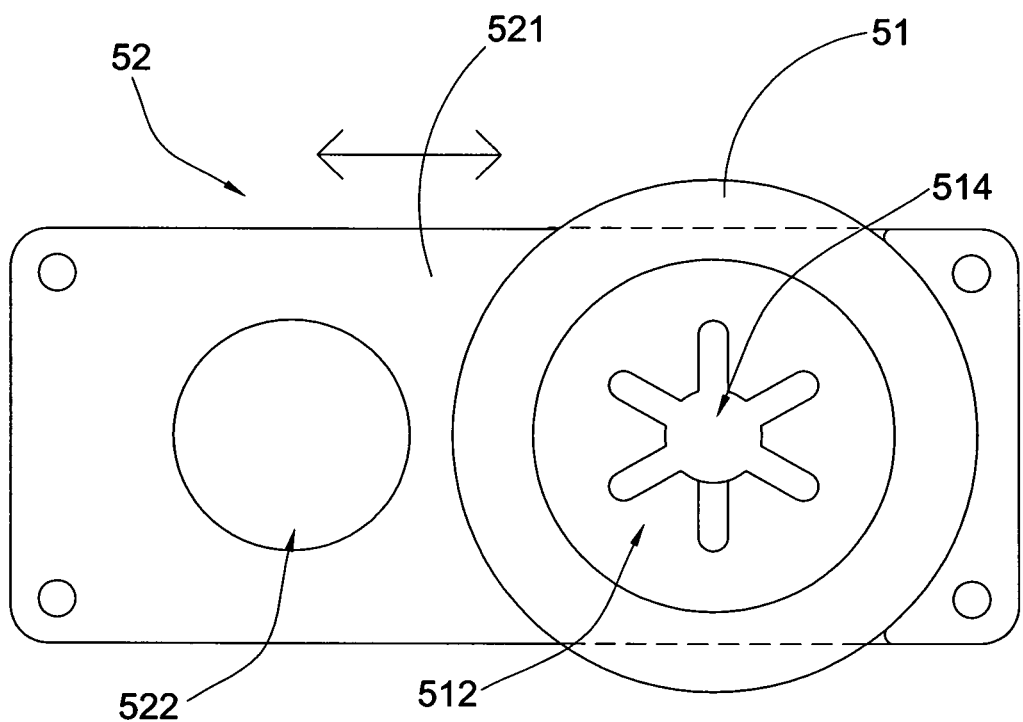
FIG. 4 is a schematic diagram of the protective cap of the frost swirl machine according to the above preferred embodiment of the present invention.

Referring to FIG. 1 to FIG. 4 of the drawings, a frosty swirl machine according to a preferred embodiment of the present invention is illustrated, in which the frosty swirl machine comprises a housing 10, a funnel 20, an auger 30, a driving unit 40, and a protective cap 50. The housing 10 has a receiving cavity 11 formed therein, an defines a swirling platform 12.

The funnel 20 has a storing cavity 21 movably supported in the swirling platform 12, and is arranged to contain a mixture of ice-cream and additives, wherein the funnel 20 further has a mixture outlet 22 communicated with the storing cavity 21.

The auger 30 is rotatably supported in the housing 10, in such a manner that the auger 30 is arranged to selectively receive in the storing cavity 21 for swirling the ice-cream and the additives.

The driving unit 40 is received in the housing and is arranged to selectively drive the auger 30 to rotate in the storing cavity 21 for swirling the ice-cream and the additives.

The protective cap 50 has a passage opening 53 movably mounted at the mixture outlet 22 of the funnel 20, in such a manner that the protective cap 50 is capable of moving between a opened position and a closed position, wherein in the opened position, the protective cap 50 is moved to align the passage opening 53 with the mixture outlet 22 of the funnel 20 so as to allow the mixture to pour out of the funnel 20 through the mixture outlet 22 and the passage opening 53, wherein in the closed position, the protective cap 50 is moved to block the mixture outlet 22 so as to prevent the mixture from being poured out of the funnel 20.

According to the preferred embodiment of the present invention, the housing 10 has an upper portion 13 for supporting the driving unit 40 and the auger 30, and a lower swirling portion 14 downwardly extended from the upper portion 13 to form the swirling platform 12, wherein the funnel 20 is supported in the swirling portion 14.

The funnel 20 has a conical shape which defines an upper mixture inlet 23 and the lower mixture outlet 22, wherein the storing cavity 21 is formed between the upper mixture inlet 23 and the lower mixture outlet 22 for storing the ice cream and additives mixture. Furthermore, the upper mixture inlet 23 is aligned with the auger 30 so that when the auger 30 and the funnel 20 are relatively moved toward each other, the auger 30 is arranged to receive in the storing cavity 21 through the upper mixture inlet 23. Note that one of the funnel 20 and the auger 30 is moved towards the other so as to receive the auger 30 within the storing cavity 21 of the funnel 20.

Furthermore, the auger 30 comprises an auger shaft 31 extended from the upper portion 13 of the housing 10, and a plurality of swirling fins 32 spirally extended a longitudinal direction of the auger shaft 31 for mixing the ice-cream with the additives when the auger shaft 31 is driven to rotate by the driving unit 40. It is worth mentioning that in order to maximize an effectiveness and efficiency of the swirling process, a diameter of the auger shaft 31 and the circumference of the swirling fins 32 are gradually decreasing with decreasing height of the auger shaft 31.

The driving unit 40 is received in the upper portion 13 of the housing 10 and is mechanically connected to a top end portion of the auger shaft 31 for driving the auger shaft 31 to rotate. The rotation of the auger shaft 31 drives the swirling fins 32 to swirl the ice-cream mixture contained in the storing cavity 21 of the funnel 20. Preferably, the driving unit 40 comprises a motor for performing the driving mechanism just mentioned.

The protective cap 50 comprises a cap body 51, and a cap slider 52 slidably mounted on the cap body 51 for allowing the protective cap 50 to move between the opened position and the closed position. More specifically, the cap body 51 has an engaging compartment 511 indently formed thereon to define a bottom wall 512 and a sidewall 513 of the engaging compartment 511. Furthermore, the cap body 51 further has a through aesthetic slot 514 formed on the bottom wall 512 of the engaging compartment 511, wherein the aesthetic slot 514 is shaped and crafted to form a predetermined cross sectional shape such that when the ice-cream mixture passes through the aesthetic slot 514, the resulting serving of ice-cream will form a corresponding external contour.

Note that the engaging compartment 511 has a circular cross section in which a diameter thereof is slightly larger than a diameter of the mixture outlet 22 of the funnel 20 so that a lower end portion of the funnel 20 can be received in the engaging compartment 511 while the mixture outlet 22 is aligned with the aesthetic slot 514 of the cap body 51.

On the other hand, the cap slider 52 comprises a sliding panel 521 having an elongated structure, and has a through slot 522 formed on a side portion of the sliding panel 521, in such a manner the cap slider 52 is capable of sliding with respect to the cap body 51 underneath the engaging compartment 511 for aligning the through slot 522 with the aesthetic slot 514. When the aesthetic slot 514 is aligned with the through slot 522 and the mixture outlet 22 of the funnel 20, the ice-cream mixture is capable of being discharged out of the funnel 20 through the mixture outlet 22, the aesthetic slot 514 and the through slot 522. In other words, the aesthetic slot 514 and the through slot 522 constitute the passage opening 53 of the protective cap 50.

Thus, when the protective cap 50 is at the opened position, the sliding panel 521 is slid so as to align the through slot 522 with the aesthetic slot 514 of the engaging compartment 511. Conversely, when the protective cap 50 is at the closed position, the sliding panel 521 is slid so as to block the aesthetic slot 514 by the sliding panel 521 itself. As such, the ice-cream mixture is retained in the storing cavity 21 of the funnel 20.

The frosty swirl machine further comprises a rinsing mechanism 60 provided in the housing 10 for selectively cleaning the auger 30 when it is driven to swirl the ice-cream and additives mixture. The rinsing mechanism 60 comprises water tube 61 having a first end connected to an external water source, and a second end extended from the upper portion 13 of the housing 10 to a position which is in the vicinity to the auger 30 for allowing a predetermined amount of water to reach the auger 30 for rinsing thereof, a pumping device 62 mounted in the receiving cavity 11 of the housing 10 and is arranged to selectively initiate a controlled flow of water in the water tube 61, and an activation switch 63 provided in the housing 10, and is operatively linked to the pumping device 62 in such a manner that a user is able selectively and conveniently operate on the activation switch 63 to activate the pumping device 62. When the pumping device 62 is activated, a flow of water is developed in the water tube 61 and the water is able to be ejected from the second end of the water tube 61 for rinsing the auger 30 and the funnel.

The frosty swirl machine further comprises a shielding arrangement 70 supported by the housing 10 for preventing spill of the ice-cream mixture stored in the storing cavity 21. More specifically, the shielding arrangement 70 comprises a sealing cap 71 mounted on the auger 30, wherein a diameter of the sealing cap 71 is slightly larger than that of the mixture inlet 23 of the funnel 20 so that when the auger 30 is received in the storing cavity 21, the sealing cap 71 is arranged to completely cover the mixture inlet 23 of the funnel 20 so as to prevent the ice-cream and additives mixture to spill from the mixture inlet 23, especially when the auger 30 is swirling the ice-cream and additives mixture.

The sealing cap 71 preferably has a circular cross section and has an upper portion 711 and a lower portion 712 integrally extended from the upper portion 711, wherein a diameter of the upper portion 711 is slightly larger than that of the lower portion 712 so as to form a cap shoulder 713 between the upper portion 711 and the lower portion 712, wherein the mixture inlet 23 of the funnel 20 is arranged to selectively engage with the cap shoulder 713 for preventing spill of the ice-cream and additives mixture.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A frosty swirl machine, comprising:
a housing which has a receiving cavity formed therein, an defines a swirling platform;
a funnel having a storing cavity movably supported in said swirling platform, and is arranged to contain a mixture of ice-cream and additives, wherein said funnel further has a mixture outlet communicated with said storing cavity;
an auger rotatably supported in said housing, in such a manner that said auger is arranged to selectively receive in said storing cavity for swirling said ice-cream and said additives;
a driving unit received in said housing and is arranged to selectively drive said auger to rotate in said storing cavity for swirling said ice-cream and said additives;
a protective cap having a passage opening movably mounted at said mixture outlet of said funnel, in such a manner that said protective cap is capable of moving between a opened position and a closed position, wherein in said opened position, said protective cap is moved to align said passage opening with said mixture outlet of said funnel so as to allow said mixture to pour out of said funnel through said mixture outlet and said passage opening, wherein in said closed position, said protective cap is moved to block said mixture outlet so as to prevent said mixture from being poured out of said funnel; and
a rinsing mechanism provided in said housing for selectively cleaning said auger when said auger is driven to swirl said ice-cream and additives, wherein said rinsing mechanism comprises water tube having a first end connected to an external water source, and a second end extended from said upper portion of said housing to a position which is in a vicinity of said auger for allowing a predetermined amount of water to reach said auger for rinsing thereof, wherein said rinsing mechanism further comprises a pumping device mounted in said receiving cavity of said housing and is arranged to selectively initiate a controlled flow of water in said water tube, and an activation switch provided in said housing, and is operatively linked to said pumping device in such a manner that a user is able selectively and conveniently operate on said activation switch to activate said pumping device for initiating a flow of water in said water tube so as to rinse said auger and said funnel, wherein said funnel has a conical shape which defines an upper mixture inlet and said lower mixture outlet, wherein said storing cavity is formed between said upper mixture inlet and said lower mixture outlet for storing said ice cream and additives mixture, wherein said upper mixture inlet is aligned with said auger so that when said auger and said funnel are relatively moved toward each other, said auger is arranged to receive in said storing cavity through said upper mixture inlet, wherein said auger comprises an auger shaft extended from an upper portion of said housing, and a plurality of swirling fins spirally extended a longitudinal direction of said auger shaft for mixing said ice-cream with said additives when said auger shaft is driven to rotate by said driving unit, wherein said protective cap comprises a cap body, and a cap slider slidably mounted on said cap body for allowing said protective cap to move between said opened position and said closed position, wherein said cap body has an engaging compartment indently formed thereon to define a bottom wall and a sidewall of said engaging compartment, wherein said cap body further has a through aesthetic slot formed on said bottom wall of said engaging compartment.

2. The frosty swirl machine, as recited in claim 1, wherein said engaging compartment has a circular cross section in which a diameter thereof is slightly larger than a diameter of said mixture outlet of said funnel so that a lower end portion of said funnel is capable of being received in said engaging compartment while said mixture outlet is aligned with said aesthetic slot of said cap body.

3. The frosty swirl machine, as recited in claim 2, wherein said cap slider comprises a sliding panel having an elongated structure, and has a through slot formed on a side portion of said sliding panel, in such a manner said cap slider is capable of sliding with respect to said cap body underneath said engaging compartment for aligning said through slot with said aesthetic slot, wherein when said aesthetic slot is aligned with said through slot and said mixture outlet of said funnel, said ice-cream mixture is capable of being discharged out of said funnel through said mixture outlet.

4. The frosty swirl machine, as recited in claim 3, wherein said aesthetic slot and said through slot constitute said passage opening of said protective cap in such a manner that when said protective cap is at said opened position, said sliding panel is slid so as to align said through slot with said aesthetic slot of said engaging compartment, wherein when said protective cap is at said closed position, said sliding panel is slid so as to block said aesthetic slot by said sliding panel.

5. A frosty swirl machine, comprising:
a housing which has a receiving cavity formed therein, an defines a swirling platform;
a funnel having a storing cavity movably supported in said swirling platform, and is arranged to contain a mixture of ice-cream and additives, wherein said funnel further has a mixture outlet communicated with said storing cavity;
an auger rotatably supported in said housing, in such a manner that said auger is arranged to selectively receive in said storing cavity for swirling said ice-cream and said additives;
a driving unit received in said housing and is arranged to selectively drive said auger to rotate in said storing cavity for swirling said ice-cream and said additives;
a protective cap having a passage opening movably mounted at said mixture outlet of said funnel, in such a manner that said protective cap is capable of moving between a opened position and a closed position, wherein in said opened position, said protective cap is moved to align said passage opening with said mixture outlet of said funnel so as to allow said mixture to pour out of said funnel through said mixture outlet and said passage opening, wherein in said closed position, said protective cap is moved to block said mixture outlet so as to prevent said mixture from being poured out of said funnel;

a rinsing mechanism provided in said housing for selectively cleaning said auger when said auger is driven to swirl said ice-cream and additives, wherein said rinsing mechanism comprises water tube having a first end connected to an external water source, and a second end extended from said upper portion of said housing to a position which is in a vicinity of said auger for allowing a predetermined amount of water to reach said auger for rinsing thereof, wherein said rinsing mechanism further comprises a pumping device mounted in said receiving cavity of said housing and is arranged to selectively initiate a controlled flow of water in said water tube, and an activation switch provided in said housing, and is operatively linked to said pumping device in such a manner that a user is able selectively and conveniently operate on said activation switch to activate said pumping device for initiating a flow of water in said water tube so as to rinse said auger and said funnel; and a shielding arrangement supported by said housing for preventing spill of said ice-cream mixture stored in said storing cavity, wherein said shielding arrangement comprises a sealing cap mounted on said auger, wherein a diameter of said sealing cap is slightly larger than that of said mixture inlet of said funnel so that when said auger is received in said storing cavity, said sealing cap is arranged to completely cover said mixture inlet of said funnel so as to prevent said ice-cream and said additives from spilling out of said funnel, wherein said sealing cap preferably has a circular cross section and has an upper portion and a lower portion integrally extended from said upper portion, wherein a diameter of said upper portion is slightly larger than that of said lower portion so as to form a cap shoulder between said upper portion and said lower portion, wherein said mixture inlet of said funnel is arranged to selectively engage with said cap shoulder for preventing spill of said ice-cream and said additives, wherein said funnel has a conical shape which defines an upper mixture inlet and said lower mixture outlet, wherein said storing cavity is formed between said upper mixture inlet and said lower mixture outlet for storing said ice cream and additives mixture, wherein said upper mixture inlet is aligned with said auger so that when said auger and said funnel are relatively moved toward each other, said auger is arranged to receive in said storing cavity through said upper mixture inlet, wherein said auger comprises an auger shaft extended from an upper portion of said housing, and a plurality of swirling fins spirally extended a longitudinal direction of said auger shaft for mixing said ice-cream with said additives when said auger shaft is driven to rotate by said driving unit, wherein said protective cap comprises a cap body, and a cap slider slidably mounted on said cap body for allowing said protective cap to move between said opened position and said closed position, wherein said cap body has an engaging compartment indently formed thereon to define a bottom wall and a sidewall of said engaging compartment, wherein said cap body further has a through aesthetic slot formed on said bottom wall of said engaging compartment.

6. The frosty swirl machine, as recited in claim 5, wherein said engaging compartment has a circular cross section in which a diameter thereof is slightly larger than a diameter of said mixture outlet of said funnel so that a lower end portion of said funnel is capable of being received in said engaging compartment while said mixture outlet is aligned with said aesthetic slot of said cap body.

7. The frosty swirl machine, as recited in claim 6, wherein said cap slider comprises a sliding panel having an elongated structure, and has a through slot formed on a side portion of said sliding panel, in such a manner said cap slider is capable of sliding with respect to said cap body underneath said engaging compartment for aligning said through slot with said aesthetic slot, wherein when said aesthetic slot is aligned with said through slot and said mixture outlet of said funnel, said ice-cream mixture is capable of being discharged out of said funnel through said mixture outlet.

8. The frosty swirl machine, as recited in claim 7, wherein said aesthetic slot and said through slot constitute said passage opening of said protective cap in such a manner that when said protective cap is at said opened position, said sliding panel is slid so as to align said through slot with said aesthetic slot of said engaging compartment, wherein when said protective cap is at said closed position, said sliding panel is slid so as to block said aesthetic slot by said sliding panel.

9. The frosty swirl machine, as recited in claim 8, wherein a diameter of said auger shaft and an outer circumference of said swirling fins are gradually decreasing with decreasing height of said auger shaft.

* * * * *